(12) United States Patent
Iyer et al.

(10) Patent No.: US 11,586,841 B2
(45) Date of Patent: Feb. 21, 2023

(54) METHOD AND SYSTEM FOR GENERATING USER DRIVEN ADAPTIVE OBJECT VISUALIZATIONS USING GENERATIVE ADVERSARIAL NETWORK MODELS

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidhar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 99 days.

(21) Appl. No.: 17/011,084

(22) Filed: Sep. 3, 2020

(65) Prior Publication Data

US 2022/0004809 A1     Jan. 6, 2022

(30) Foreign Application Priority Data

Jul. 1, 2020   (IN) .............................. 202041028083

(51) Int. Cl.
*G06K 9/62*       (2022.01)
*G06F 16/26*      (2019.01)
(Continued)

(52) U.S. Cl.
CPC .......... *G06K 9/6253* (2013.01); *G06F 16/26* (2019.01); *G06K 9/6256* (2013.01); *G06K 9/6262* (2013.01); *G06N 20/00* (2019.01); *G06T 11/00* (2013.01); *G06T 15/00* (2013.01); *G06T 2200/24* (2013.01)

(58) Field of Classification Search
CPC .. G06K 9/6253; G06K 9/6256; G06K 9/6262; G06F 16/26; G06N 20/00; G06T 11/00; G06T 15/00; G06T 2200/24; G06T 19/20; G06T 2210/16; G06T 2219/2024; G06V 10/454; G06V 10/774; G06V 10/776; G06V 10/82
See application file for complete search history.

(56) References Cited

U.S. PATENT DOCUMENTS 8,095,582 B2    1/2012  Cramer
10,108,720 B2   10/2018 Chen et al.
(Continued)

FOREIGN PATENT DOCUMENTS

CN          105426399 A       3/2016

*Primary Examiner* — Michael Le
(74) *Attorney, Agent, or Firm* — Finnegan, Henderson, Farabow, Garrett & Dunner, LLP (57) ABSTRACT

A method and system for generating user driven adaptive object visualizations using Generative Adversarial Network (GAN) models is disclosed. The method includes the steps of generating a first set of object vectors for an object based on at least one input received from a user. The first set of vectors corresponds to a first set of visualizations for the object The method further includes capturing at least one tacit reaction type of the user in response to user interaction with each of the first set of visualizations, computing a score for each portion of each of the first set of visualizations, identifying a plurality of portions from at least one of the first set of object visualizations, generating a second set of object vectors, and processing the second set of object vectors sequentially through a plurality of GAN models to generate a final object visualization of the object.

20 Claims, 8 Drawing Sheets

(51) Int. Cl.
*G06N 20/00* (2019.01)
*G06T 11/00* (2006.01)
*G06T 15/00* (2011.01)

(56) References Cited

U.S. PATENT DOCUMENTS

| | | | | |
|---|---|---|---|---|
| 10,157,332 | B1* | 12/2018 | Gray | G06T 11/60 |
| 10,453,111 | B2 | 10/2019 | Melcher et al. | |
| 10,963,939 | B1* | 3/2021 | Zehr | G06V 10/764 |
| 2018/0189858 | A1* | 7/2018 | Melcher | H04L 63/107 |
| 2019/0251401 | A1* | 8/2019 | Shechtman | G06V 30/19173 |
| 2019/0295302 | A1* | 9/2019 | Fu | G06N 3/088 |
| 2021/0012486 | A1* | 1/2021 | Huang | G06N 3/08 |
| 2021/0209464 | A1* | 7/2021 | Bala | G06N 3/08 |
| 2021/0303927 | A1* | 9/2021 | Li | G06K 9/6262 |
| 2021/0358164 | A1* | 11/2021 | Liu | G06T 7/73 |
| 2021/0383538 | A1* | 12/2021 | Deasy | G06T 7/11 |

\* cited by examiner

METHOD AND SYSTEM FOR GENERATING USER DRIVEN ADAPTIVE OBJECT VISUALIZATIONS USING GENERATIVE ADVERSARIAL NETWORK MODELS

TECHNICAL FIELD

The present invention relates to user driven adaptive object visualizations. In particular, the present invention relates to method and system for generating user driven adaptive object visualizations using GAN models.

BACKGROUND

Sometimes, users need to design products of their visualizations. A product of user's visualization may be a blend of different objects. A user may visualize the product randomly or based on his creative skills. Further, there may be a requirement of a platform that may help the user to design and generate an image(s) of the product analogous to user's visualizations by merging his visualization features and randomly seen features or patterns.

Today, various conventional systems and methods are available that generate synthetic images. However, the conventional systems and methods are not capable of generating accurate results exactly matching user's visualization. The conventional systems and methods may generate results similar to existing images in a database by automatically adding keywords in a search query provided by a user. As a result, the results and user's creativity are limited to already existing objects, features, combination of these only. Consequently, the conventional system and methods lacks in displaying accurate image that may exactly match the user's visualization.

SUMMARY

In one embodiment, a method for generating user driven adaptive object visualizations using Generative Adversarial Network (GAN) models is disclosed. In one embodiment, the method may include generating a first set of object vectors for an object based on at least one input received from a user. The first set of vectors may correspond to a first set of visualizations for the object. The method may further include capturing at least one tacit reaction type of the user in response to user interaction with each of the first set of visualizations. The method may further include computing a score for each portion of each of the first set of visualizations based on the associated at least one tacit reaction type. The method may further include identifying a plurality of portions from at least one of the first set of object visualizations. It should be noted that the score computed for each of the at least one portion may be greater than a predefined threshold. The method may further include generating a second set of object vectors based on the plurality of identified portions. The second set of object vectors may correspond to a second set of visualizations for the object. The method may further include processing the second set of object vectors sequentially through a plurality of GAN models to generate a final object visualization of the object.

In yet another embodiment, a system for generating user driven adaptive object visualizations using Generative Adversarial Network (GAN) models is disclosed. The system includes a processor and a memory communicatively coupled to the processor, wherein the memory stores processor instructions, which, on execution, causes the processor to generate a first set of object vectors for an object based on at least one input received from a user. The first set of vectors may correspond to a first set of visualizations for the object. The processor instructions further cause the processor to capture at least one tacit reaction type of the user in response to user interaction with each of the first set of visualizations. The processor instructions further cause the processor to compute a score for each portion of each of the first set of visualizations based on the associated at least one tacit reaction type. The processor instructions further cause the processor to identify a plurality of portions from at least one of the first set of object visualizations. It should be noted that the score computed for each of the at least one portion may be greater than a predefined threshold. The processor instructions further cause the processor to generate a second set of object vectors based on the plurality of identified portions. The second set of object vectors may correspond to a second set of visualizations for the object The processor instructions further cause the processor to process the second set of object vectors sequentially through a plurality of GAN models to generate a final object visualization of the object.

In yet another embodiment, a non-transitory computer-readable medium storing computer-executable instruction for generating user driven adaptive object visualizations using Generative Adversarial Network (GAN) models is disclosed. In one example, the stored instructions, when executed by a processor, may cause the processor to perform operations including generating a first set of object vectors for an object based on at least one input received from a user. The first set of vectors may correspond to a first set of visualizations for the object The operations may further include capturing at least one tacit reaction type of the user in response to user interaction with each of the first set of visualizations. The operations may further include computing a score for each portion of each of the first set of visualizations based on the associated at least one tacit reaction type. The operations may further include identifying a plurality of portions from at least one of the first set of object visualizations. The score computed for each of the at least one portion may be greater than a predefined threshold. The operations may further include generating a second set of object vectors based on the plurality of identified portions. The second set of object vectors may correspond to a second set of visualizations for the object. The operations may further include processing the second set of object vectors sequentially through a plurality of GAN models to generate a final object visualization of the object.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
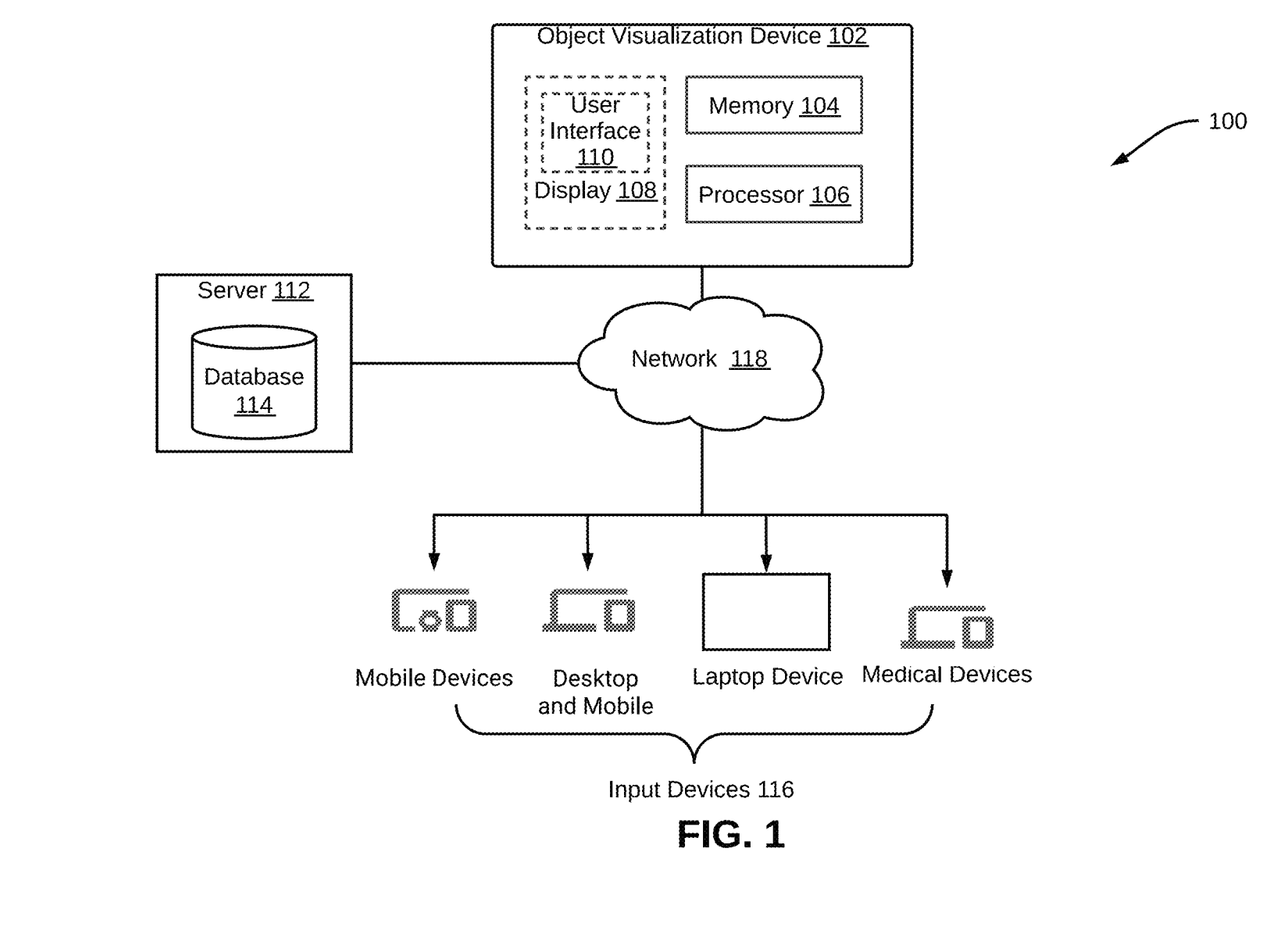
FIG. 1 is a block diagram of a system for generating user driven adaptive object visualizations using Generative Adversarial Network (GAN) models, in accordance with an embodiment.

In one embodiment, a system 100 for generating user driven adaptive object visualizations using Generative Adversarial Network (GAN) models is illustrated in the FIG. 1. In an embodiment, the system 100 may be used to resolve a problem of generating accurate results matching to user's visualizations, using an object visualization device 102. The object visualizations may be generated for objects, which for example, may include clothes, ornaments, accessories, or furniture. The object visualization device 102 may generate a final result of object visualization by merging visualization features, randomly seen patterns, features or objects, and user's facial expressions, body gesture, motion of eyesight, while observing an object or features of the object. The final result may be synthetically generated and may include matching products that are relevant to user's creative visualizations and patterns/features observed. Examples of the object visualization device 102 may include, but are not limited to, a server, a desktop, a laptop, a notebook, a netbook, a tablet, a smartphone, a mobile phone, an application server, or the like.

The object visualization device 102 may include a memory 104, a processor 106, and a display 108. The memory 104 and the processor 106 of the object visualization device 102 may perform various functions including generating different sets of object vectors, capturing user's tacit reactions, computing relevancy scores, and training GAN models. The memory 104 may store instructions that, when executed by the processor 106, cause the processor 106 to generate user driven adaptive object visualizations. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The display 108 may further include a user interface 110. A user or the administrator may interact with the object visualization device 102 and vice versa through the display 108. By way of an example, the display 108 may be used to display results of analysis (i.e., object visualizations) performed by the object visualization device 102, to the user. By way of another example, the user interface 110 may be used by the user to provide inputs to the object visualization device 102.

As will be described in greater detail in conjunction with FIG. 2 to FIG. 8, in order to generate user driven adaptive object visualizations, the object visualization device 102 may extract a plurality of images matching an input image and semantic text provide by the user, from a server 112, which may further includes a database 114 of images.

The semantic text and input image may also be received by the object visualization device 102 from one or more of a plurality of input devices 116. Examples of the plurality of input devices 116 may include, but are not limited to a desktop, a laptop, a notebook, a netbook, a tablet, a smartphone, a remote server, a mobile phone, or another computing system/device. The object visualization device 102 may generate user driven adaptive object visualizations and may then share the generated results with one or more of the plurality of input devices 116. The plurality of input devices 116 may be communicatively coupled to the object visualization device 102, via a network 118. The network 118 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
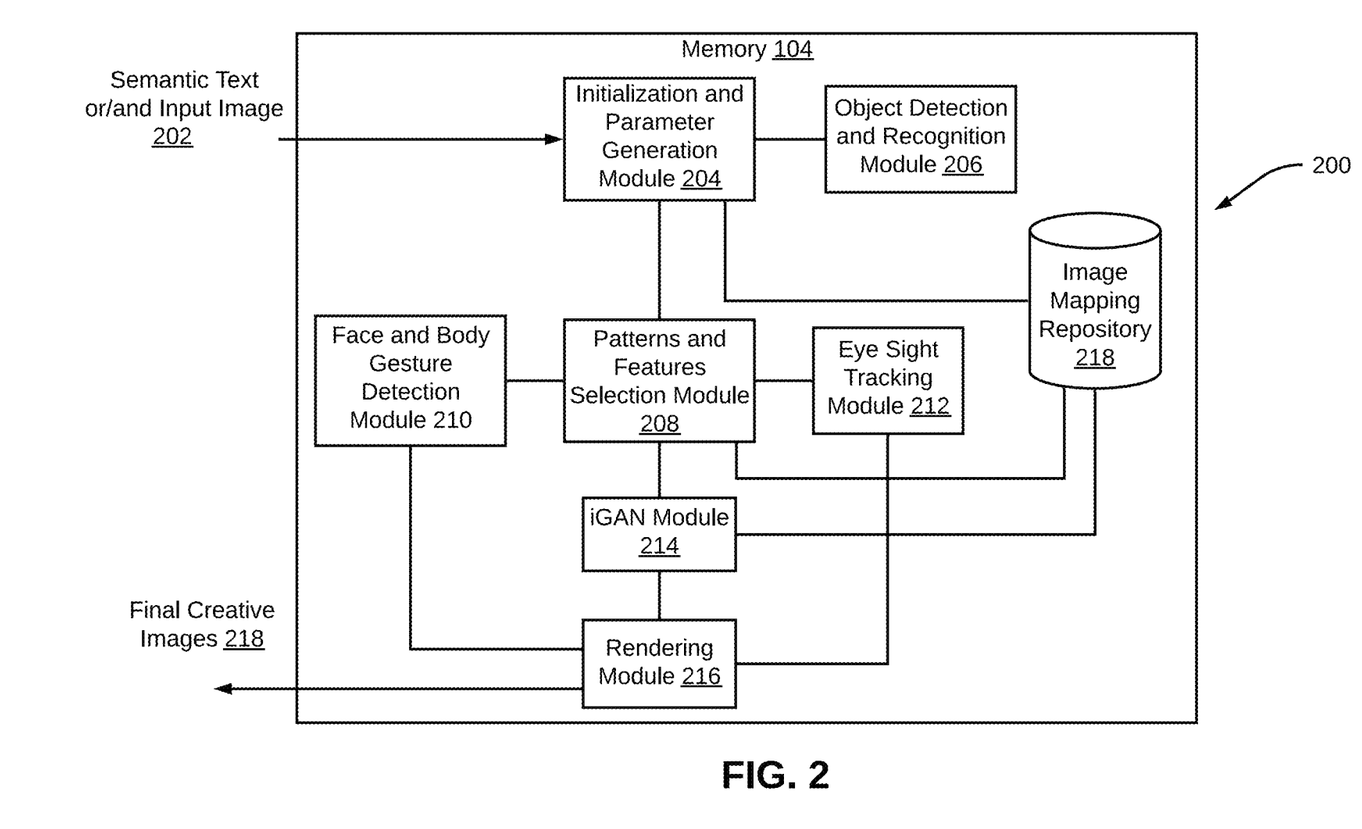
FIG. 2 is a block diagram of various modules within a memory of an object visualization device configured to generate user driven adaptive object visualizations using GAN models, in accordance with an embodiment.

Referring now to FIG. 2, a block diagram of various modules within the memory 104 of the object visualization device 102 configured to generate user driven adaptive object visualizations using GAN models is illustrated, in accordance with an embodiment. The memory 104 of the object visualization device 102 may include various modules for performing multiple operations to generate results matching a user's visualizations. The object visualization device 102 may receive the semantic text and input image 202 and may generate final creative images 218. The modules within the memory 104 of the object visualization device 102 may include an initialization and parameter generation module 204, an object detection and recognition module 206, a patterns and features selection module 208, a face and body gesture detection module 210, an eye sight tracking module 212, an Intelligent GAN (iGAN) module 214, a rendering module 216, and an image mapping repository 218.

The initialization and parameter generation module 204 may receive the input image and semantic text 202 provided by a user. Further, the initialization and parameter generation module 204 may generate a Three Dimensional (3D) virtual image (for example, a template object) from a design object associated with the input image. It should be noted that the design object may be an object associated with the input image. Also, the template object may be referred to a 3D user image or a 3D object for which a creative design image is being generated. After generating the creative design image, it may be applied to the template object for verification. In some embodiments, a virtual mirror or an Augmented Reality/Virtual Reality (AR/VR) device may be used by the initialization and parameter generation module 204 to generate the 3D virtual image. In some other embodiments, a high-end camera to generate the 3D virtual image may be used. Further, the design object may be searched locally in the image mapping repository 218 and top search results may be considered as a first set of object vectors.

The object detection and recognition module 206 may be configured to receive each image and the first set of candidate vectors and may further detect objects in each image and may label the objects accordingly. The object detection and recognition module 206 may include at least one of a You Look Only Once (YOLO) model, a Fast Recurrent Convoluted Neural Network (RCNN) model, and a Single Shot Detector (SSD) model for detecting objects. The output of the object detection and recognition module 206 may form bounding boxes around the detected objects and may provide labels for each of the bounding boxes. In case, an instance segmentation model is used, each instance of similar object may be detected and labelled distinctly. Additionally, the object detection and recognition module 206 may be trained with a set of training images with bounding box around the objects. In some embodiments, the object detection and recognition module 206 may be trained offline periodically to keep the model updated with latest images of user's events, and stored images.

The patterns and features selection module 208 may be communicatively connected to the face and body gesture module 210 as well as the eye sight tracking module 212. The patterns and features selection module 208 may merge user's reaction with existing first set of objects and images and may then generate a selection list. Based on the selection list, the patterns and features selection module 208 may form a second set of candidate images or a second set of object vectors for receiving user recommendation.

The face and body gesture detection module 210 may detect facial expressions and body gestures of the user. For detecting facial expressions or emotions, a face and emotion detection model that uses Deep Learning (DL) architecture, may be used. The face and emotion detection model may include at least one of a CNN model and a Long-Short Term Memory (LSTM) model. In some embodiments, a combination of these two models may be used to detect emotions over a period of time. The face and body gesture detection module 210 may detect user's emotions, when the user observes the objects displayed on the screen. Further, for detecting body gestures another DL model may be used. The face and body gesture detection module 210 may generate results such as, Happy, Neutral and Not Happy. Corresponding enumerations for these results, for example, may be '1', '0.5' and '0.0001', respectively.

The eye sight tracking module 212 may use at least one of a DL model, infrared eye tracking system, and AR/VR devices, to capture a region of sight on an image being displayed to the user. Various parameters, for example, eye gaze, eye movements, and dilation of pupil may be considered by the eye sight tracking module 212. It should be noted that each parameter may be considered for different purpose like, eye movement may provide region of sight of user's observation and dilation of pupil may be used to read user's vision response about image selection. The eye gaze and eye movements of the user together may be used to capture the region of sight of the user on the image being displayed.

The iGAN module 214 may receive the second set of vectors from the Patterns and features selection module 208. Patterns (for example, stripes, squares) or features (for example, color, length) from historical data may be provided as input to the iGAN module 214. The iGAN module 214 may include a Creative Adversarial Network (CAN) model and a series of GAN models to generate a set of synthetic images or creative design objects blending the input design object with patterns and visualization of the user. The user may get 'N' number of synthetic images from the iGAN module 214 as recommendations. The set of synthetic images may be referred as the final set of vectors matching the user's visualization.

The rendering module 216 may be configured to apply the final set of vectors to the template object. The template object may be visualized in virtual mirror or any 3D visualization tool to check whether a creative synthetic image is impressive to the user or not. The virtual mirror or 3D visualization tool allows the user to customize and combine the template object with other accessories to validate the creative synthetic image.

Figure 3:
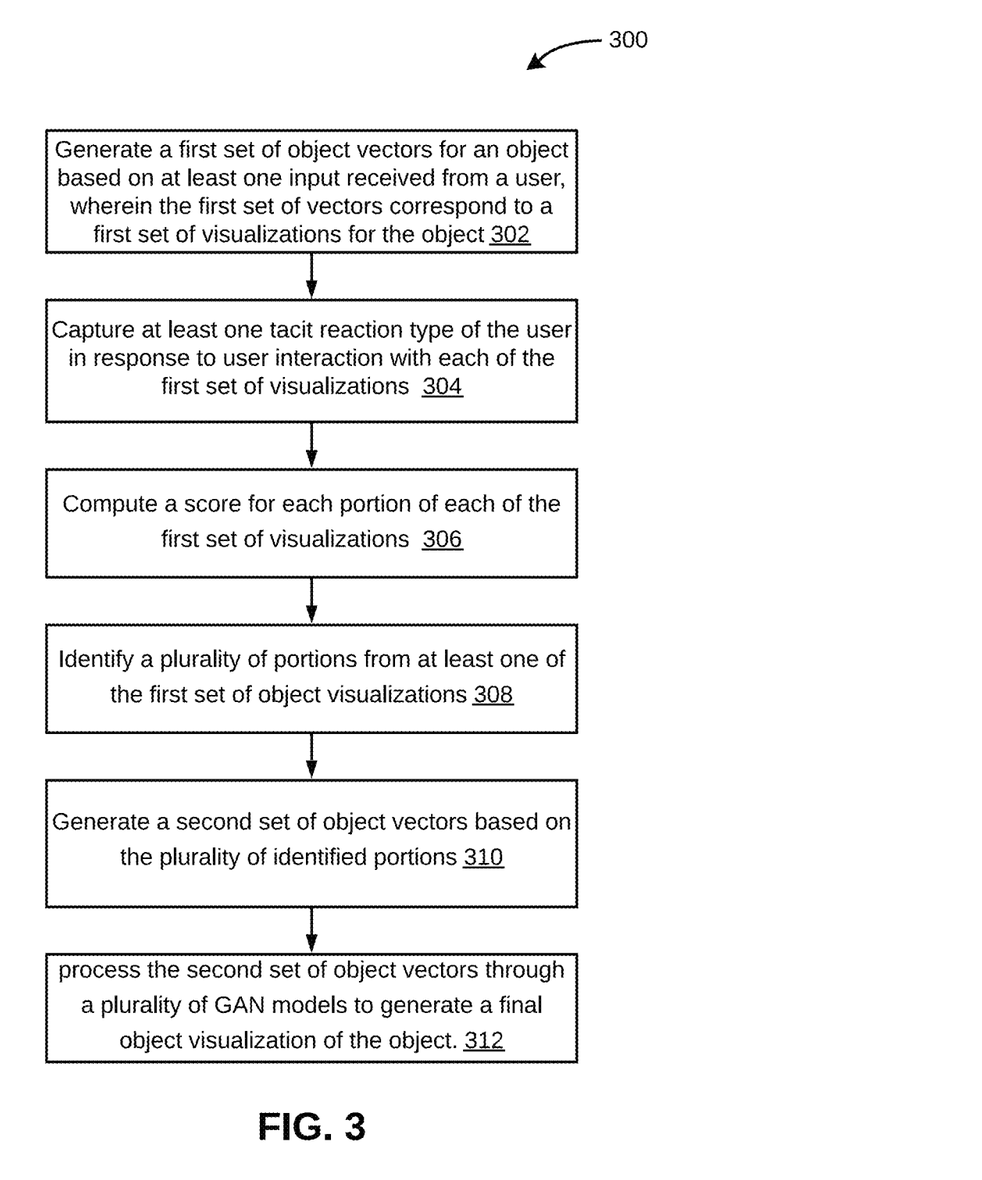
FIG. 3 is a flowchart of a method for generating user driven adaptive object visualizations using GAN models, in accordance with an embodiment.

Referring now to FIG. 3, a flowchart 300 of a method for generating user driven adaptive object visualizations using GAN models is illustrated, in accordance with an embodiment. Each step of the flowchart 300 may be performed by various modules 204-216 within the object visualization device 102. At step 302, a first set of object vectors may be generated for an object. The object, for example, may be . . . . . It should be noted that at least one input received from a user may be used to generate the first set of object vectors. The at least one input may include, but are not limited to at least one image and a semantic input, which may be in the form of voice or text. In some embodiments, each of the at least one image is processed through an object detection model to identify an object of interest. Also, it should be noted that the first set of object vectors may correspond to a first set of visualizations for the object.

In some embodiments, the first set of object vectors may be generated corresponding to a user query by performing a local search of objects in the image mapping repository 218 using an object detection model. To generate the first set of object vectors, a 3D virtual image may be generated by the initialization and parameter generation module 204. In some embodiments, a virtual mirror or an AR/VR device may be used to continue without generating the 3D virtual image. Additionally, in some embodiments, a plurality of pictures or images of the object may be captured using an imaging device like a camera or a web camera. It should be noted that the plurality of images may be taken at different angles and may be uploaded to get a 3D view of the object. A 2D to 3D image conversion Computer Vision (CV) technique may be used by the object visualization device 102 to generate the 3D image of the object. In case, the imaging device is unavailable, a plurality of existing images may be used generate a blended 3D image of the object, using the CV technique.

Further, parameters such as length, breadth, and depth of the object may be determined by the CV technique. Based on this, the 3D virtual image of an environment (for example, the user) may be created. In some embodiments, a group photo with the user in it may be provided as input image to the object visualization device. In such embodiments, the group photo may be processed by the object detection and recognition module 206 in order to extract an object image separately and then to generate the 3D virtual image of the object.

When the user provides a semantic input, a semantic analysis may be performed on the user query. During the semantic analysis, a design object corresponding to the user input design patterns or objects may be visualized. The design object may be searched in a local database (for example, the image mapping repository 218) using the semantic input. A number of visually similar objects mapping to the semantic input may be identified. A plurality of images that are associated with the number of visually similar objects may be considered as top results or the first set of object vectors.

By way of an example, consider a situation where a data repository includes database of various retail stores and there is a requirement to search for a shirt, for example a 'Blue Shirt.' In this case, the system 100 may use a trained LSTM model. Therefore, instead of searching the design object or the 'Blue Shirt' in the entire repository, the system 100 may identify name of the associated object detection model, database name of the related retail store, and other related details like tables related to fashion. Now, the 'Blue Shirt' may be searched in the fashion database suggested by the LSTM model to get all the images of blue shirt. That may further form the first set of object vectors.

Thereafter, at step 304, at least one tacit reaction type of the user may be captured in response to user interaction with each of the first set of visualizations. The at least one tacit reaction type may include, but are not limited to at least one of facial expressions, eye movement, or body gestures. It should be noted that the face and body gesture detection module 210 may detect the at least one tacit reaction type. Further, a face expression or emotion detection model that uses a DL architecture, for example, a CNN, an LSTM, or combination of them, may be used by the face and body gesture detection module 210. The facial expressions or emotions of the user's face may be detected, when the object is observed by the user. In an embodiment, three types of facial expressions, i.e., happy, neutral, or unhappy may be detected. It should be noted that each of the three types of facial expressions may be represented by different enumeration. By way of an example, for facial expressions happy, neutral, and, unhappy, values '1', '0.5', and '0.0001' may be assigned, respectively.

Additionally, the face and body gesture detection module 210 may use the DL architecture to detect the body gestures and associated emotions. Similar to the face expression or emotion detection model, results of the body gesture detection model may also include emotions happy, neutral, and unhappy and their corresponding enumerations may be '1', '0.5' and '0.0001', respectively.

The eye sight tracking module 212 may include at least one of an eye tracking system with DL model, an infrared eye tracking system, and AR/VR devices. Further, region of sight may be captured by the eye sight tracking module 212 on the image being displayed to the user. The eye sight tracking module 212 may determine eye gaze, eye movement and dilation of pupil using the eye tracking system that includes multiple DL models. Each of the DL models may be used for different purpose. For example, out of three DL models, one may be used for eye gaze detection and remaining two may be used for detection of eye movement and dilation of pupil. The eye movement may provide the region of sight of the user's observation and dilation of pupil may be used to read user's vision response about image selection. The eye gaze and eye movements of the user together may be used to capture the region of sight of the user on the image being displayed. The DL model associated with eye gaze may provide multiple parameters, also referred to as gaze parameters.

The gaze parameters may include, but are not limited to Region Fixations, Revisits, Changes Sight, Changes Region Sight, and Fixations. The gaze parameter 'Region Fixations' may provide information about a period of time for which the gaze of the user remains on parts of the object. A number of times the user revisits or returns back or gazes the object or parts of the object may correspond to the gaze parameter 'Revisits.' Further, the gaze parameter 'Changes Sight' may correspond to a number of times the user changes gaze from one object to another and 'Changes Region Sight' may correspond to a number of times the user changes gaze from one part of the object to another. Lastly, the gaze parameter 'Fixations' may indicate a period of time the gaze of the user remains on the object.

At step 306, a score for each portion of each of the first set of visualizations may be computed. For computing the score, the associated at least one tacit reaction type may be considered. Further, the combination of gaze parameters and eye movement parameters may be used to detect the region of sight including co-ordinate values for parts of the object. Also, the DL model associated with dilation of pupil provide user's vision response towards the parts of the object and the object. In some embodiments, user's vision response towards the parts of the object may be assigned with a numerical value, represented by 'E'. Now user's choice based on the user's vision towards the object or parts of object may be calculated based on a plurality of parameters including the emotion detected (F) from the face emotion detection model, the emotion detected (B) from the body gesture and emotion detection model, and the quantitative user's vision response value (E) from eye sight tracking model In some embodiments, one or more Internet of Things (IoT) sensors or one or more IoT devices may be used to observe the user's response. For example, the user may wear a smart watch that may include the IoT sensors. The IoT sensors may collect information regarding a plurality of constraints, for example, but not limited to respiratory rate, heart rate, blood pressure, galvanic skin response, pupil dilation. In addition, psychology of the user based on historical data may be used as one of the plurality of constraints, in accordance with some embodiments. It may be noted that each of the plurality of constraints may contribute in different proportions. Thus, a weighted average of the plurality of constraints may be used, and a Personal Score (P) may be computed. Thereafter, an appealing Score (AS) may be calculated to identify user's overall vision response for each part of the object. To calculate the appealing score, all the above values may be aggregated with respective weightage values.

In some embodiments, when the AR/VR device or the eye tracking system is not available, the system 100 may display each image of the first set of object vectors with a check box for the user. Further, the system may observe whether the check box is ticked or not, for each image. Based on the ticked check box and events, the object visualization device 102 may predict user's choice corresponding to that particular image. The events may include zoom in, zoom out, a period of time an image stays on the screen before a next image is displayed, a number of times an image is viewed. Based on the events, a quantitative user's vision response value (E) may be determined. In case the check box is ticked, the value of 'E' may be assigned with value '1'. Thereafter, the values of 'F' and 'B' may be obtained based on the value of 'E', from face emotion detection model and body gesture and emotion detection model and further the appealing score may be calculated.

At step 308, a plurality of portions from at least one of the first set of object visualizations may be identified. The score computed for each of the at least one portion may be greater than a predefined threshold. In some embodiments, the appealing score may be used to identify the plurality of portions. In an exemplary embodiment, the appealing score may be determined for all parts of the object and among all the parts only three parts with the highest appealing score may be considered as a user's choice.

Based on the plurality of identified portions, at step 310, a second set of object vectors may be generated. The second set of object vectors may correspond to a second set of visualizations for the object. In some embodiments, the second set of object vectors corresponding to a user query may be generated. To generate the second set of object vectors, the emotions of the user while displaying local search results may be identified. In some embodiments, a recommendation string may match to some of the images based on part of initial content ('blue shirt'). Now each image may be passed through the object detection model, which may generate the images with bounding boxes around the objects and may generate labels for each instance of the same object. The user may select one or more images that map to the user's visualization or desire.

At step 312, the second set of object vectors may be processed sequentially through a plurality of GAN models (for example, the iGAN module 214) to generate a final object visualization of the object. The objective of this step is to generate synthetic image using pre-trained iGAN models based on the generated second set of object vectors and user's history.

The second set of object vectors received from the Patterns and features selection module 208 and the patterns (for example, stripes squares, etc.) or features for example, color, length, etc.) stored in the image mapping repository 218 may be passed through the iGAN module 214. The iGAN module 214 may include a CAN model and a plurality of GAN models to generate synthetic images, as described in greater detail in conjunction to FIG. 6. It should be noted that the creative design objects may blend input design object, patterns and visualization of the user. Here, 'N' number of synthetic images may be generated as recommendations. The synthetic images may form a final set of images matching the user's creative visualization.

Figure 4:
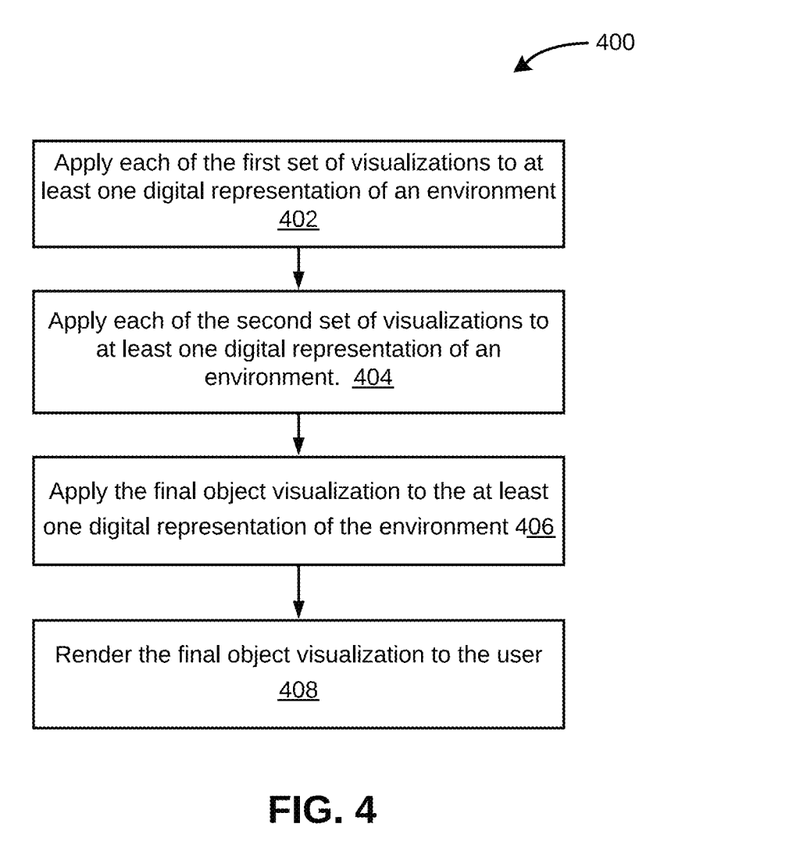
FIG. 4 is a flowchart of a method for rendering a final object visualization to the user, in accordance with an embodiment.

Referring now to FIG. 4, a flowchart 400 of a method for rendering a final object visualization to the user is illustrated, in accordance with an embodiment. At step 402, each of the first set of visualizations may be applied to at least one digital representation of an environment. The environment, for example, may include a user, a body part of the user, an animal, a room, an office space, or a furniture. The at least one digital representation of an environment may include at least one of a Two-Dimensional (2D) image, a 3D image, or an interactive 3D image. At step 404, each of the second set of visualizations may be applied to at least one digital representation of the environment. At step 406, the final object visualization may be applied to the at least one digital representation of the environment. By way of an example, if the environment is a 3D model of a user and an object is a shirt, shirt visualizations may be rendered on the 3D model of the user. At step 408, the final set of visualizations may be rendered to the user.

By way of an example, a final creative synthetic image or the final set of visualizations may be applied to a 3D template object. The 3D template object may be visualized in virtual mirror or any 3D visualization tool to check whether the creative synthetic image is impressive to the user or not. The virtual mirror or 3D visualization tool may allow the user to customize the template object with other accessories to validate the creative synthetic image. After applying the final set of visualizations to the template object, the user's response may again be observed based on user's expressions and eyesight.

Further, an appealing score may be determined to predict the user's decision for the final creative image. In some embodiments, the user may use the method to create remaining accessories for the template object. Thus, the method may be used iteratively for effective results.

Figure 5:
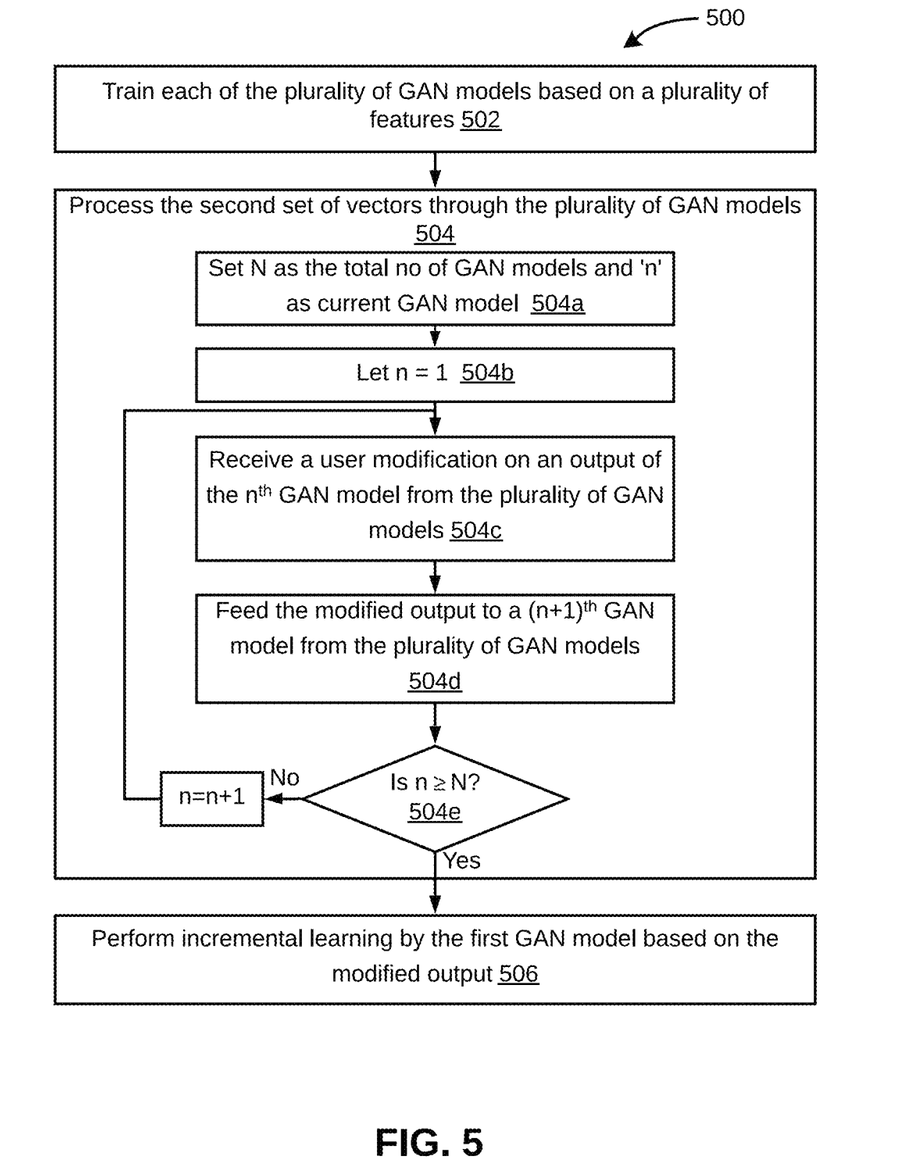
FIG. 5 is a flowchart of a method for training an Intelligent GAN (iGAN) model, in accordance with an embodiment.

Referring now to FIG. 5, a flowchart 500 of a method for training an iGAN model is illustrated, in accordance with an embodiment. At step 502, each of a plurality of GAN models may be trained. A plurality of features may be used to train the plurality of GAN models. It should be noted that the plurality of features may include an associated feature based data used to train the plurality of GAN models. In other words, a given GAN model may correspond to one or more features from the plurality of features. Additionally, the given GAN model is trained based on data that includes the one or more features. The plurality of features may be derived based on a plurality of attributes associated with the object. In other words, the number of features directly correspond to the plurality of attributes.

At step 504, the second set of vectors may be processed through the plurality of GAN models. The step 504 may include five sub steps, i.e., steps 504a to 504e. At step 504a, the total no of GAN models is set as 'N' and a current GAN model is set as 'n'. At step 504b, the value of 'n' is set to '1'. At step 504c, a user modification on an output of the $n^{th}$ GAN model (for example, a first GAN model) from the plurality of GAN models may be received. At step 504d, the modified output may be fed to a $(n+1)^{th}$ (for example, the second GAN model) from the plurality of GAN models. The $(n+1)^{th}$ model sequentially succeeds the $n^{th}$ model.

At step 504e, a check is performed to determine whether the current value of 'n' is greater than or equal to 'N.' If the current value of 'n' is less than 'N,' the value of 'n' is increase by 1 and the control thereafter moves to the step 504c. However, if the current value of 'n' is greater than or equal to 'N,' at step 506, incremental learning may be performed by the $n^{th}$ GAN model based on the modified output. A detailed embodiment for training the iGAN model is provided in conjunction with FIG. 6.

Figure 6:
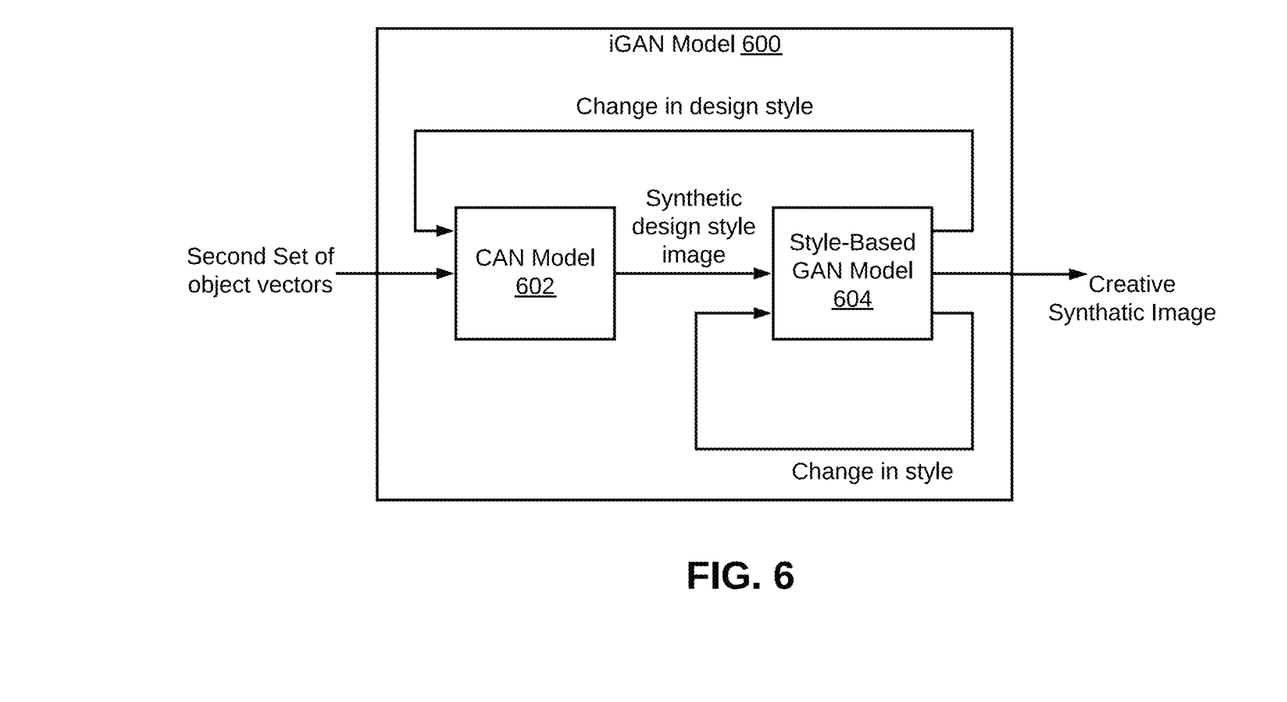
FIG. 6 is a block diagram representing expended view of an iGAN model, in accordance with an embodiment.

Referring now to FIG. 6, an iGAN model 600 is illustrated, in accordance with an exemplary embodiment. A combination of the CAN model and one or more style-based GAN models may be referred to as the iGAN model 600. As illustrated in FIG. 6, the iGAN model 600 may include a CAN model 602 and a style-based GAN model 604 to generate a final set of object visualizations.

The iGAN model 600 may ingest the second set of object vectors through the CAN model 602. Further, the iGAN model 600 may generate 'N' number of synthetic images of various design styles. When, one or more of the 'N' number of synthetic images matches to the user's creative visualization, the one or more matched images are transmitted for subsequent processing. Otherwise, the user is allowed to edit one or more of the synthetic images using a visual art tool. After that, the one or more edited synthetic images may again be fed to the style-based GAN 604 to modify and again generate one or more synthetic images. In some embodiments, there may be 'N' number of synthetic images for each style of 'M' synthetic images generated by the CAN model 602. In case, there is no match between each style of 'M' synthetic images and user's visualization, the user may be allowed to edit the creative synthetic image matching to the user's visualization using the visual art tool. It will be apparent to a person skilled in the art that the iGAN model 600 may include multiple style-based GAN models (referred to as iGAN pipeline) and is not limited to the style-based GAN models 604. Thus, the edited creative image may be again fed to the iGAN pipeline to continue this process until the final set of visualization or appropriate one or more synthetic images are generated.

As discussed above, the iGAN pipeline may include a plurality of GAN models, which are added to the pipeline based on the number of features required for the system. In an exemplary embodiment, a loss for the iGAN pipeline may be computed, as per equation (1), given below:

$$\text{Loss of iGAN pipeline} = \lambda_i \text{ Loss of CAN model} + \lambda_i \text{ Loss of } 1^{st} \text{ style based GAN model} + \ldots \lambda_i \text{ Loss of } n\text{th style based GAN model} \quad (1)$$

where, $\Sigma \lambda_i = 1$, and 'i' varies from 1 to n,

'n' represents the total number of style-based GAN models present in the pipeline of iGAN.

The highest value of 'i' in '$\lambda_i$' may be decided based on a system requirement. For example, in case of a style dominant system, '2' may be the highest value assigned for 'i' and the equation (1) may include '$\lambda_1$' and '$\lambda_2$'. the iGAN pipeline may be trained to minimize the loss of pipeline.

The iGAN model 600 may be trained to generate better results. The CAN model 602 may be trained using designs and design style class labels. For example, a design style class of men's fashion may include, but is not limited to, a full sleeve style, half sleeve style, round neck style, collared neck style, designed buttons style, patterned buttons style, round bottom style, semi round bottom style, medium fit style, tight fit style, and the like. In some embodiments, a loss function for training the iGAN model 600 may be calculated as per equation 2, given below:

$$\min_G \max_D V(D,G) = E_{x,c' \sim P_{data}}[\log D_r(x) + \log D_c(c=c'|x)] + E_{w \sim P_z}[\log(1-D_r(G(w))) - \Sigma_{k=1}^{k}(1/K \log(D_c(ck|G(w)) + (1-1/K)\log(1-D_c(ck|G(w))))] \quad (2)$$

where,

'w' is a noise vector sampled from distribution pw (say, a uniform or gaussian distribution), 'x'& 'c'' may indicate a real image and corresponding design style label from data distribution $P_{data}$, '$D_r(.)$' represents a transformation function that tries to discriminate between a real design style and generated design images, '$D_c(.)$' is a function that discriminates between different design style categories and estimates the design style class i.e., $D_c(ck|.) = p(ck|.)$.

Further, the style-based GAN model 604 may provide potential benefit of controlling different visual features of images generated by the CAN model 602. When resolution of the image is lower, features may be affected coarsely by the style-based GAN model 604. In other words, feature control of the image may be performed based resolution of the images. For example, for an image with resolution of up to '82', shape, neck, collar type, and alignment may be controlled. In case an image has a resolution between '162' to '322', finer design style features like patterns, sleeve type may be controlled. Further, for resolution between '642' to '5122', color, gradient, and other micro design style features may be affected or controlled.

It should be noted that the CAN model 602 and the style-based GAN model 604 may be trained independently. The CAN model 602 may be trained with design style images and corresponding labels. On the other hand, the style-based GAN model 604 may be trained based on low level and high level finer visual features along with the input design style images.

Figure 7:
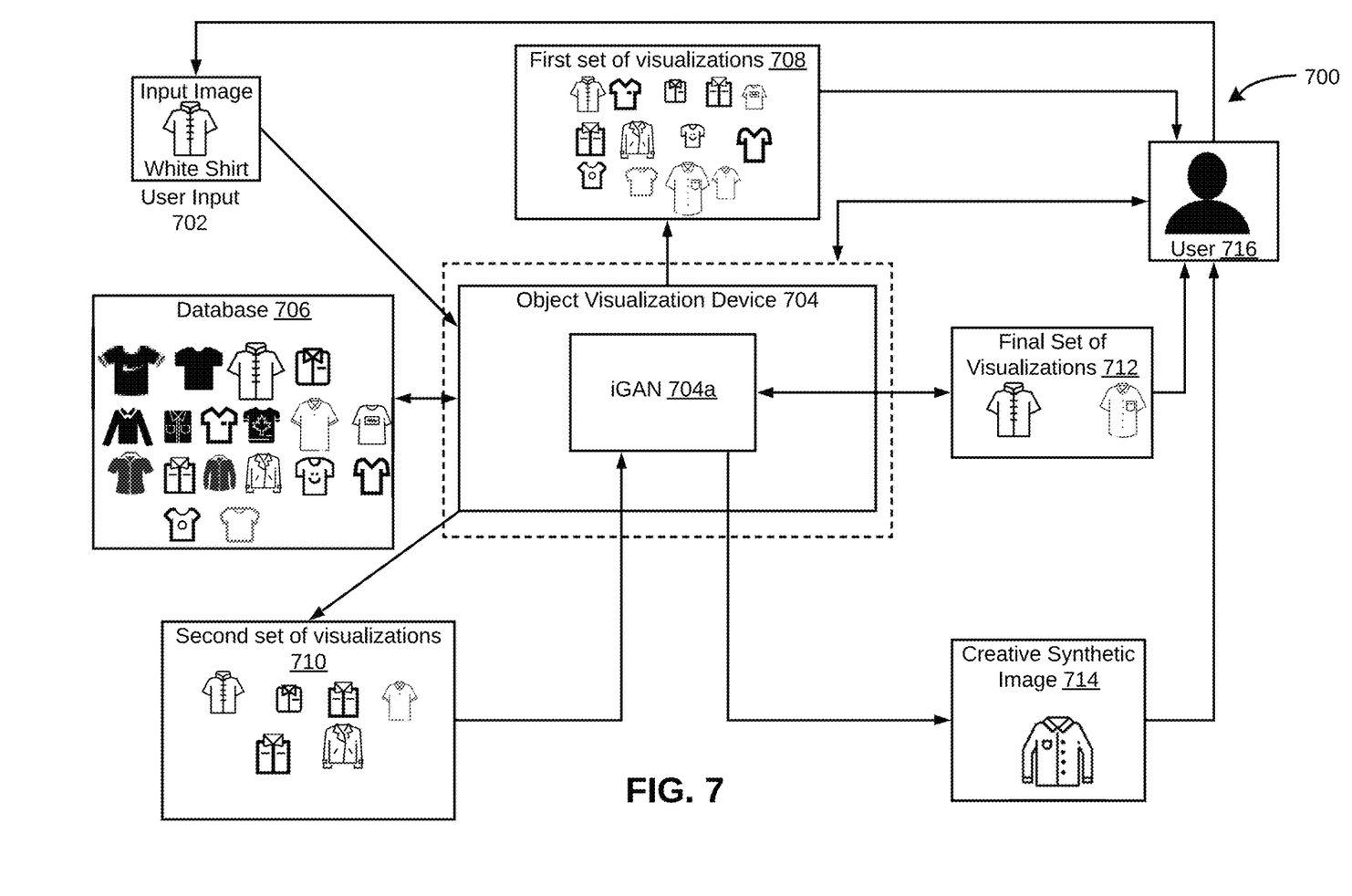
FIG. 7 is a block diagram of an exemplary system for generating user driven adaptive object visualizations using iGAN models, in accordance with an exemplary embodiment.

Referring now to FIG. 7, an exemplary system 700 for generating user driven adaptive object visualizations using iGAN) model is illustrated, in accordance with an exemplary embodiment. By way of an example consider a situation, where a user 716 visualizes a shirt that may include the features: white color, medium length, full sleeves and pattern of the shirt may include one pocket on left side of the shirt, four buttons, full sleeves, and collared neck. For that, a user input 702 that may include an image and a semantic text may be provided to the object visualization device 704 (analogous to the object visualization device 102). The object visualization device 704 may locally perform a search based on the user input 702 in the database 706.

The database 706 may include a plurality of shirts with different patterns, designs, and colors. The object visualization device 704 may select a set of shirts based on the initial user input 702 'White shirt' and may generate a first set of visualizations 708 for the shirt. The first set of visualizations 708 may include only those shirts that are white in color. Further, the system 700 may allow the user 716 to interact with the first set of shirts and may observe response of the user 716 towards each portion of objects associated with the first set of shirts. Based on the response of the user 716, the system 700 may compute relevancy scores for each portion of the objects. In an exemplary scenario, a total of three best results having relevancy scores greater than a threshold may be considered to generate a second set visualizations 710 for the shirt. Further, the second set visualizations 710 may be passed through an iGAN 704a within the object visualization device 704. Thereafter, the iGAN 704a may generate a final set of visualizations 712 and provide that to the user 716. In this exemplary embodiment, it may be considered that the user 716 is not satisfied with the final set of visualization 712. Therefore, the final set of visualizations 712 may be again passed through the iGAN model 704a until a satisfactory result like a creative synthetic image 714 is obtained. Finally, the creative synthetic image 714 may be accepted by the user 716. Also, the system 700 may allow the user 716 to apply the creative synthetic image 714 to a template object for validation, which in this case may be a 3D model of the user 716.

By way of an example of an application of the method and system described above, consider a situation, where a user wants to purchase a product of his choice in a fashion retail shop. Now, the user may want to use his creative skills and visualizations to customize a shirt. The user may visualize the shirt based on his preferences of purchase made earlier in the retail shop and random selection of patterns, features and objects. The user may use the system and method described above for generating his visualizations associated with the shirt. Initially, the system may display some results (for example, the first set of shirts) by mapping all the existing images of shirts to the user's previous purchases.

Thereafter, the system may observe the user's response towards the displayed results by capturing his facial expressions, body gesture, or eye movement. For example, a second set of shirts may be generated by the system, when the user moves his eyes to express his choice. Now, the system may process the second set of shirts through an iGAN model and may show final results. However, the user may still not be satisfied with the final results. In that situation, the system may allow the user to edit the final results again and again until satisfactory results matching to the user's choice are displayed. Also, the system may allow the user to check how he/she looks after wearing the customized shirt along with other accessories. Further, if the user may wish to have a poster with a unique object, the system may be trained based on posters, drawings, pictures, art images, or the like.

By way of another example of an application of the method and system described above, a user may want his/her own custom built spectacle frame, color, and design. For example, the user may have seen a particular color and frame type in an advertisement. However, the user was not able to get the same type of spectacle anywhere in all her searches (both in web and brick-mortar outlets). Conventional systems are limited to showing results of the spectacle types that are already existing and those which maps closest to the images of spectacles of the user's previous searches based on history. In contrast, the present system and method understands the user's selection of choice, color, and spectacle frame type and presents the user's own and unique choice type. The present system and method also enabled the user to modify or edit the intermediate designs, such that, the new design suits the user's requirement. The user may further check and verify how he/she looks after wearing the spectacles along with the user's particular choice of dress combination. Thus, by way of the present system and method, the user gets the design of his/her choice and validates it in real-time using a virtual mirror or a 3D visual tool. As a result, the user satisfied as his/her complete requirement and color and frame type choice is easily met.

By way of yet another application of the method and system described above, on the way to work, a user may have seen a shampoo advertisement in a bill-board. After going to office and coming back home, the user may completely forget the name of the shampoo brand that she wanted to try. To this end, the user may invoke the present system and is able to build a synthetic image for the shampoo brand based on the color, background, and some blurry images that the user remembered. Finally, by way of the present system, the user receives an image of the product of her choice and validates the same. The user is thus satisfied as her complete requirement is easily met.

The present disclosure may provide many advantages in order to overcome the problems encountered in conventional systems and methods. As discussed above, the present disclosure includes intelligence of blending creative visualization features that may or may not exist in the database. The present system and method may provide flexibility to the user to validate his visualized objects and perceive how the visualized objects would look when used it in real life. Additionally, the system method provides various advantages like less time consumption, less efforts for the manufacturer, retailer, consumer, and allows creative experience for the consumer. Also, the disclosed method may be hosted as a service over cloud to display images to the user. Moreover, the system allows the user to improve creative skills without actually being the domain expert or taking help of domain expert.

Figure 8:
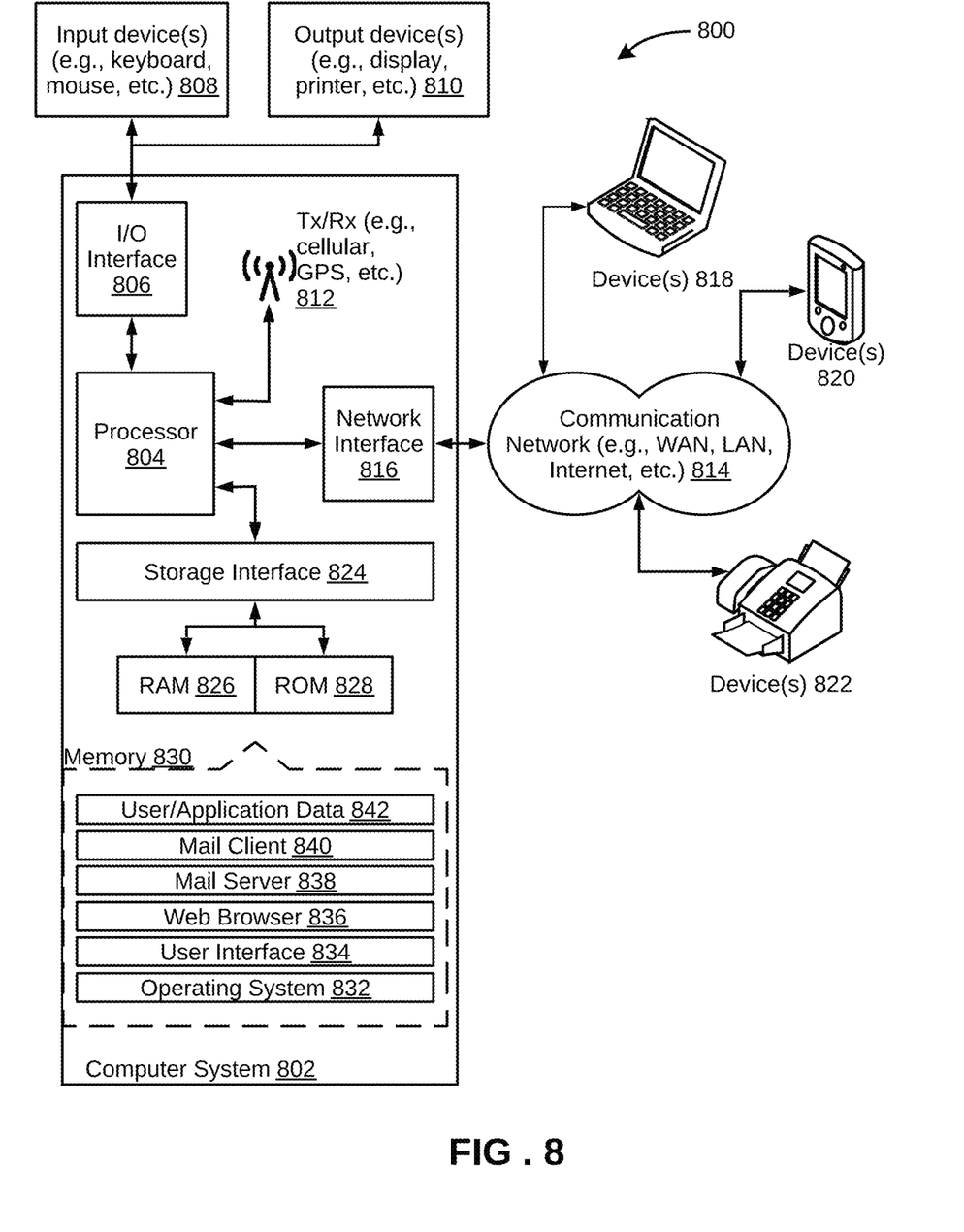
FIG. 8 illustrates a block diagram of an exemplary computer system for implementing embodiments consistent with the present disclosure.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NIN- TENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 802 may implement a mail server 838 stored program component. Mail server 838 may be an Internet mail server such as MICROSOFT® EXCHANGE® mail server, or the like.

Mail server 838 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for generating user driven adaptive object visualizations using Generative Adversarial Network (GAN) models. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating user driven adaptive object visualizations using Generative Adversarial Network (GAN) models, the method comprising:
    generating, by an object visualization device, a first set of object vectors for an object based on at least one input received from a user, wherein the first set of vectors correspond to a first set of visualizations for the object and wherein the object is indicative of a visualization from the user;
    capturing, by the object visualization device, at least one tacit reaction type of the user in response to user interaction with each of the first set of visualizations;
    computing, by the object visualization device, a score for each portion of each of the first set of visualizations based on the associated at least one tacit reaction type;
    identifying, by the object visualization device, a plurality of portions from at least one of the first set of object visualizations, wherein the score computed for each of the at least one portion is greater than a predefined threshold;
    generating, by the object visualization device, a second set of object vectors based on the plurality of identified portions, wherein the second set of object vectors corresponds to a second set of visualizations for the object; and
    processing, by the object visualization device, the second set of object vectors sequentially through a plurality of GAN models to generate a final object visualization of the object, wherein processing the second set of vectors through the plurality of GAN models comprises iteratively performing one or more steps, based on the number of plurality of GAN models, till an output from a last GAN model from the plurality of GAN models is received, the one or more steps comprising:
        receiving a user modification on an output of a first GAN model from the plurality of GAN models; and
        feeding the modified output to a succeeding GAN model from the plurality of GAN models, wherein the succeeding GAN model sequentially succeeds the first GAN model.

2. The method of claim 1, wherein the at least one input comprises at least one image and a semantic input, and wherein each of the at least one image is processed through an object detection model to identify an object of interest.

3. The method of claim 1, further comprising:
    applying each of the first set of visualizations to at least one digital representation of an environment; and
    applying each of the second set of visualizations to the at least one digital representation of the environment.

4. The method of claim 3, further comprising rendering to the user, wherein rendering comprising applying the final object visualization to the at least one digital representation of the environment.

5. The method of claim 3, wherein the at least one digital representation of an environment comprising at least one of a Two Dimensional (2D) image, a Three Dimensional (3D) image, or an interactive 3D image.

6. The method of claim 1, further comprising training each of the plurality of GAN models based on a plurality of features, wherein each of the plurality of features comprises an associated feature based data used to train the plurality of GAN models.

7. The method of claim 6, wherein the plurality of features is derived based on a plurality of attributes associated with the object.

8. The method of claim 1, wherein the user modification comprises inputs received via at least one visual art tool, and wherein the number of the plurality of GAN models corresponds to variance in the plurality of features.

9. The method of claim 1, further comprising assigning weights to a loss associated with each of the plurality of GAN models, wherein a weight is assigned to an associated GAN model based on relevance of the associated GAN model for generating object visualizations.

10. The method of claim 1, further comprising preforming incremental learning by the first GAN model based on the modified output.

11. The method of claim 1, wherein the at least one tacit reaction type comprises at least one of facial expressions, eye movement, or body gestures.

12. A system for generating user driven adaptive object visualizations using Generative Adversarial Network (GAN) models, the system comprising:
    a processor; and
    a memory communicatively coupled to the processor, wherein the memory stores processor instructions, which, on execution, causes the processor to:
        generate a first set of object vectors for an object based on at least one input received from a user, wherein the first set of vectors correspond to a first set of visualizations for the object and wherein the object is indicative of a visualization from the user;
        capture at least one tacit reaction type of the user in response to user interaction with each of the first set of visualizations;
        compute a score for each portion of each of the first set of visualizations based on the associated at least one tacit reaction type;
        identify a plurality of portions from at least one of the first set of object visualizations, wherein the score computed for each of the at least one portion is greater than a predefined threshold;
        generate a second set of object vectors based on the plurality of identified portions, wherein the second set of object vectors corresponds to a second set of visualizations for the object; and
        process the second set of object vectors sequentially through a plurality of GAN models to generate a final object visualization of the object, wherein the second set of vectors are processed through the plurality of GAN models by iteratively performing one or more steps, based on the number of plurality of GAN models, till an output from a last GAN model from the plurality of GAN models is received, the one or more steps comprising:

receiving a user modification on an output of a first GAN model from the plurality of GAN models; and feeding the modified output to a succeeding GAN model from the plurality of GAN models, wherein the succeeding GAN model sequentially succeeds the first GAN model.

13. The system of claim 12, wherein the at least one input comprises at least one image and a semantic input, and wherein each of the at least one image is processed through an object detection model to identify an object of interest.

14. The system of claim 12, wherein the processor instructions further cause the processor to:

apply each of the first set of visualizations to at least one digital representation of an environment; and apply each of the second set of visualizations to the at least one digital representation of an environment.

15. The system of claim 12, wherein the processor instructions further cause the processor to render the final object visualization to the user, wherein rendering comprising applying the final object visualization to the at least one digital representation of the environment.

16. The system of claim 12, wherein the at least one digital representation of an environment comprising at least one of a Two Dimensional (2D) image, a Three Dimensional (3D) image, or an interactive 3D image.

17. The system of claim 12, wherein the processor instructions further cause the processor to train each of the plurality of GAN models based on a plurality of features, wherein each of the plurality of features comprises an associated feature based data used to train the plurality of GAN models.

18. The system of claim 17, wherein the plurality of features is derived based on a plurality of attributes associated with the object.

19. The system of claim 12, wherein the processor instructions further cause the processor to assign weights to a loss associated with each of the plurality of GAN models, wherein a weight is assigned to an associated GAN model based on relevance of the associated GAN model for generating object visualizations.

20. A non-transitory computer-readable medium for generating user driven adaptive object visualizations using Generative Adversarial Network (GAN) models, having stored thereon, a set of computer-executable instructions causing a computer comprising one or more processors to perform steps comprising:

generating a first set of object vectors for an object based on at least one input received from a user, wherein the first set of vectors corresponds to a first set of visualizations for the object and wherein the object is indicative of a visualization from the user;

capturing at least one tacit reaction type of the user in response to user interaction with each of the first set of visualizations;

computing a score for each portion of each of the first set of visualizations based on the associated at least one tacit reaction type;

identifying a plurality of portions from at least one of the first set of object visualizations, wherein the score computed for each of the at least one portion is greater than a predefined threshold;

generating a second set of object vectors based on the plurality of identified portions, wherein the second set of object vectors corresponds to a second set of visualizations for the object; and processing the second set of object vectors sequentially through a plurality of GAN models to generate a final object visualization of the object, wherein the second set of vectors are processed through the plurality of GAN models by iteratively performing one or more steps, based on the number of plurality of GAN models, till an output from a last GAN model from the plurality of GAN models is received, the one or more steps comprising:

receiving a user modification on an output of a first GAN model from the plurality of GAN models; and feeding the modified output to a succeeding GAN model from the plurality of GAN models, wherein the succeeding GAN model sequentially succeeds the first GAN model.

\* \* \* \* \*